Oct. 7, 1952   C. E. GRUNSKY   2,613,235
MEGA VOLTMETER
Filed Oct. 20, 1948
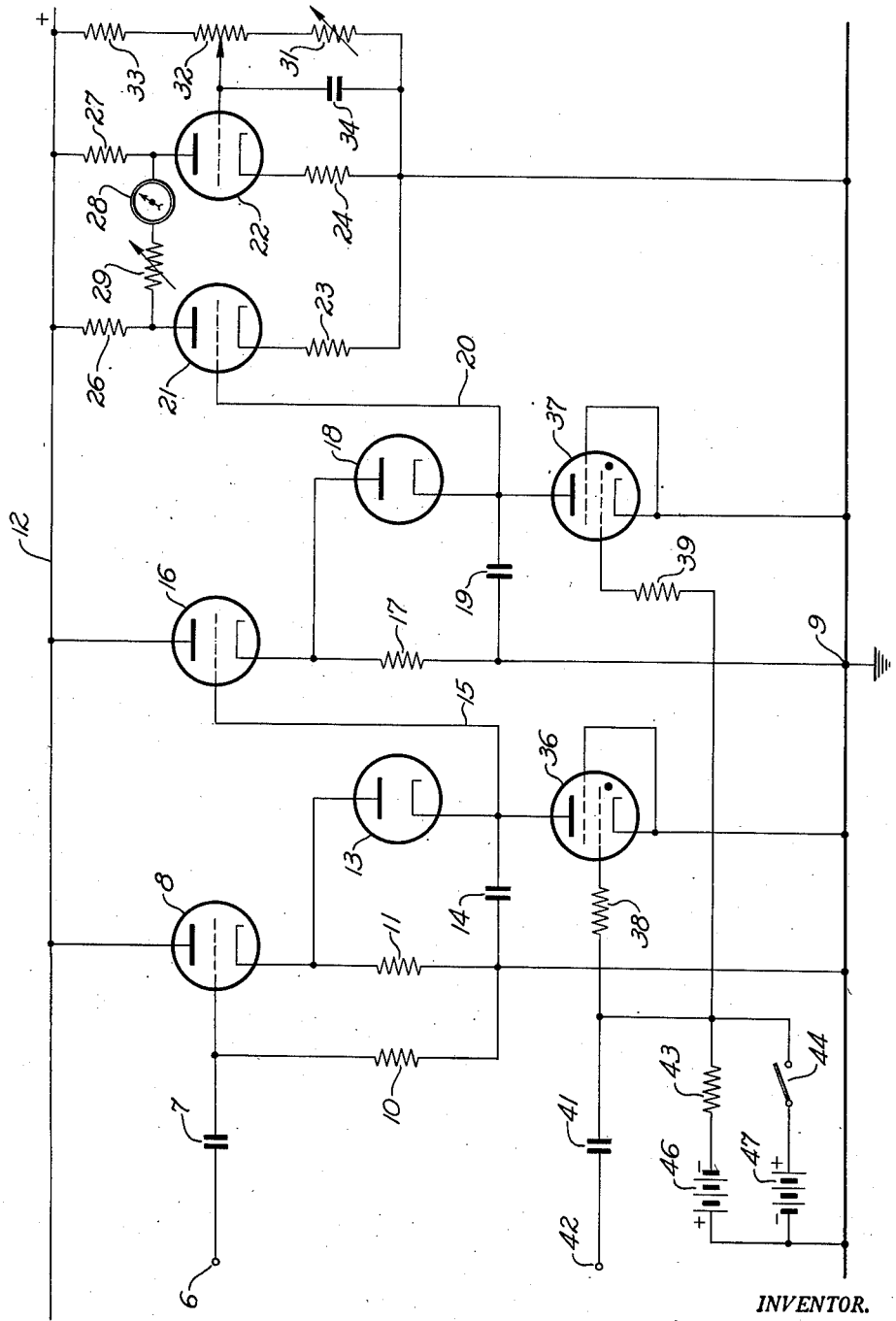
INVENTOR.
CARL E. GRUNSKY
BY
Roland A. Anderson
ATTORNEY.

Patented Oct. 7, 1952

2,613,235

UNITED STATES PATENT OFFICE 2,613,235

MEGA VOLTMETER

Carl E. Grunsky, Garden City, N. Y., assignor to the United States of America as represented by the United States Atomic Energy Commission Application October 20, 1948, Serial No. 55,601

3 Claims. (Cl. 171—95)

This invention relates to vacuum tube voltmeters and more particularly to an improved vacuum tube voltmeter for measuring the peak value of voltage pulses of extremely short duration.

In the past it has been extremely difficult to measure accurately the actual peak voltage of electrical pulses of very short duration or electrical pulses whose duration is in the order of a few microseconds. Ordinary vacuum tube voltmeter circuits are not satisfactory under these conditions or are very critical as to the wave form of the voltage pulses being measured.

The electronic voltmeter herein described is of a new type which will permit the reading of the peak value of isolated high voltage pulses which are of extremely short duration and which need not be recurrent in nature. However, with the present electronic voltmeter the peak value of recurrent voltage wave-shapes or pulses may also be ascertained, and the wave form is not a critical factor. If there is amplitude modulation of the recurrent pulses, the indicating meter will read the average value of the pulse peaks for repetition rates which are too rapid in relation to the mechanical time constant of the indicating meter for the meter to follow the individual pulses. Slow repetition rates will permit measurement of the value of each individual pulse peak.

It it therefore an object of this invention to provide a new and improved peak-reading voltmeter for measuring electrical pulses.

Another object of this invention is to provide a new and improved peak-reading voltmeter that is extremely simple in construction and which has a high degree of accuracy.

Another object of this invention is to provide a voltmeter for measuring the peak voltage of pulses having extremely short duration.

Still another object of this invention is to provide a peak-reading voltmeter for measuring non-recurring voltage pulses of extremely short duration.

A further object of this invention is to provide a peak-reading voltmeter for measuring voltage pulses of extremely short duration independently of the wave shape.

A still further object of this invention is to provide a peak-reading voltmeter wherein two capacitors are successively charged by electronic means to the peak voltage to be measured.

A still further object of this invention is to provide a peak-reading voltmeter wherein two capacitors which have been charged to the peak voltage to be measured are discharged by electronic means.

An additional object of this invention is to provide a peak-reading voltmeter of high input impedance which may be connected to pulse circuits without interfering with the operation of these circuits.

Other objects and advantages of this invention will be apparent to those skilled in the arts to which it pertains upon consideration of the following specification and drawings, in which:

The sole figure of the drawing is a schematic wiring diagram of a peak-reading voltmeter for measuring voltage pulses of extremely short duration.

Referring to the drawing in detail, there is shown an input terminal 6 connected through a capacitor 7 to the grid of a triode vacuum tube 8 connected as a cathode follower amplifier. The grid and cathode of this triode 8 are connected to ground 9 through resistors 10 and 11, respectively, and the anode of triode 8 is connected to a suitable source of voltage 12. The anode of a unidirectional valve such as a diode 13 is connected to the cathode of triode 8 and the cathode of said diode is connected to one side of a capacitor 14, the other side of which is at ground potential. The grid of a second triode 16, also connected as a cathode follower amplifier, is connected through wire 15 to the same side of the capacitor 14 as is the cathode of diode 13. The cathode of this triode 16 is connected to ground 9 through a resistor 17, and the anode of this triode is connected to the same source of voltage as triode 8. A second diode 18 has its anode connected to the cathode of triode 16 and its cathode is connected to one side of another capacitor 19, the other side of which is at ground potential.

The ungrounded side of capacitor 19 is connected through wire 20 to the input of a balanced vacuum tube voltmeter circuit including triodes 21 and 22. The cathodes of these two triodes 21 and 22 are connected to ground 9 through resistors 23 and 24, respectively; and their anodes are connected to the source of voltage 12 through resistors 26 and 27, respectively. A current meter 28 in series with a variable resistor 29 bridges the anodes of triodes 21 and 22. A variable resistor 31, a potentiometer 32, and a fixed resistor 33 are connected in series between the source of voltage and ground, so that one end of variable resistor 31 is at ground potential and one end of fixed resistor 33 is at the high potential of the voltage source, the whole forming a voltage divider. A by-pass capacitor 34 is connected between the movable contact of potentiometer 32 and ground 9; the movable contact of potentiometer 32 is also connected to the grid of triode 22.

Two gas tetrodes 36 and 37 are provided with the anodes thereof connected to the ungrounded sides of capicitors 14 and 19, respectively. The cathodes and screen grids of these gas tetrodes 36 and 37 are connected directly to ground 9. The control grids of these gas tetrodes 36 and 37 are connected through resistors 38 and 39, respectively, to a capacitor 41 which in turn connects to a terminal 42. The junction between resistors 38 and 39 and capacitor 41 is connected to a resistor 43 and one side of a switch 44; the remaining end of resistor 43 is connected to the negative terminal of a battery 46; and the other side of switch 44 is connected to the positive terminal of a battery 47. The positive terminal of battery 46 and the negative terminal of battery 47 are connected to ground 9.

The operation of this electronic peak-reading pulse voltmeter will now be considered with the voltage source 12 suitably energized. The voltage pulses whose peak value it is desired to determine are applied to the circuit between terminal 6 and ground 9. The pulse passes through capacitor 7 with ease and appears as a signal voltage across resistor 10 and is applied to the control grid of the cathode-follower 8. The capacitor 7 serves to isolate the voltmeter from the actual pulse source circuits and acts as a coupling capacitor.

The triode 8 is normally biased to near cut-off by the direct current bias which appears across the cathode resistor 11. When a positive pulse is applied to the grid of triode 8, the grid is driven in a positive direction. The cathode immediately follows the grid up and a voltage pulse appears across cathode resistor 11. This voltage pulse has an amplitude that is proportional to the pulse to be measured. The diode 13 immediately conducts and charges capacitor 14 to the peak voltage appearing across resistor 11; as soon as the voltage starts to decrease in amplitude, the diode 13 becomes non-conducting and capacitor 14 is isolated from the charging circuit. No discharge path now exists for capacitor 14 except the leakage resistance of the wiring, tube sockets, and the glass envelope of the tubes.

In order that the voltage on capacitor 14 be a true indication of the peak voltage of the pulse to be measured, the time constant of the charging circuit must be short relative to the pulse rise time; otherwise, capacitor 14 will not be charged to the peak value of the voltage appearing across resistor 11. Also the maximum allowable value of capacitor 14 is limited by the effective impedance of the cathode follower 8 and the rate of rise of the pulse or voltage wave to its peak value.

As it is desired to be able to read the voltage value on a meter for a number of seconds, capacitor 14 is too small to be employed as a storage capacitor for the meter. Therefore, the voltage pulse which capacitor 14 has collected is applied to the grid of a second triode 16 also connected as a cathode follower. This positive voltage on capacitor 14 drives the grid of this second cathode follower, which is also normally biased to near cut off, in a positive direction; and this causes the cathode to follow the grid up in voltage. Thus a voltage proportional to the peak value of the input voltage pulse appears across the cathode resistor 17, and the diode 18 immediately becomes conducting, charging the capacitor 19 up to the peak voltage appearing across resistor 17. As soon as the voltage appearing across the resistor 17 starts to decrease in value and the voltage on the anode of diode 18 falls below the cathode voltage or the voltage appearing on capacitor 19, the diode 18 becomes non-conducting and the charged capacitor 19 is isolated from the charging circuit. The only discharge path now existing for capacitor 19 is the leakage resistance of the wiring, tube sockets, and across the glass envelope of the tubes. The time constant of this charging circuit can be made much longer than that for capacitor 13, as the voltage on capacitor 14 will stay at almost peak value for a long time relative to the rise time of the initial pulse.

Since capacitor 19 is much larger than capacitor 14, capacitor 19 will maintain its charge for a very long time after diode 18 has become non-conducting.

The voltage on capacitor 19 is applied to the grid of a triode 21, one-half of a balanced voltmeter circuit. The other half of this circuit is a triode 22 whose grid is connected to the potentiometer 32. The potentiometer 32 is used to supply a positive potential to the grid of triode 22 to balance the circuit with zero voltage input to triode 21 so that the meter 28 reads "zero." The variable resistor 31 provides a fine zero set and the potentiometer 32 provides a rough zero set.

The complete circuit can be reset either automatically by means of a positive pulse or gate pulse applied to terminal 42. This positive pulse is applied to the control grids of gas tetrodes 36 and 37 through capacitor 41 and resistors 38 and 39 and overcomes the negative bias normally applied to the two control grids of these tetrodes 36 and 37. This action causes the gas tetrodes to fire or become conducting, and thus there is applied an electronic short circuit or discharge path for the two capacitors 14 and 19. This action can also be initiated by closing switch 44 which connects the positive terminal of battery 47 to the junction of resistors 38 and 39 and capacitors 41, thereby applying positive voltage to the grids of gas tetrodes 36 and 37. As soon as the capacitors 14 and 19 are discharged, the gas tetrodes cease conducting and the circuit is ready for use once more.

While I have described the salient features of this invention in detail, numerous modifications may be made within the spirit and scope of this invention, and I do not therefore desire to limit the invention to the exact details shown except insofar as they may be defined by the following claims.

What is claimed is:

1. In a measuring device, a first vacuum tube having input and output circuits, said output circuit being connected from the cathode of said first vacuum tube to ground and comprising a resistor, and a series-connected diode and capacitor in shunt with said cathode resistor, said capacitor being charged through said diode in response to a pulse to be measured which is applied to said input circuit, a second vacuum tube having input and output circuits, said output circuit being connected between the cathode of said second vacuum tube and ground and comprising a resistor and a series-connected second diode and second capacitor in shunt with said resistor, means connecting said first capacitor to the input circuit of said second vacuum tube, said second capacitor being charged through said second diode in response to the signal voltage applied to the input of said second vacuum tube circuit by said first condenser, vacuum tube voltmeter means for determining the value of charge on said second capacitor, and first and second gaseous discharge devices each containing at least a cathode, an anode, and a control grid, said first and second anodes being connected to one side of said first and second capacitors, said first and second cathodes being connected to the other side of said capacitors, and means for applying a voltage to the control grid of said gaseous discharge devices whereby said first and second capacitors are discharged.

2. In a measuring device the combination comprising first and second vacuum tubes each having an anode, a cathode, and a control electrode, first and second output circuits associated with said first and second vacuum tubes, respectively, and each including a cathode follower resistor, a capacitor, and a diode vacuum tube, said capacitor and diode being connected in series across said resistor with the diode plate connected to the cathode of the associated vacuum tube, an input circuit connected to the control electrode of said first vacuum tube for the impression of voltage pulses thereon, connecting means impressing the charge of the capacitor of said first output circuit upon the control electrode of said second vacuum tube, and indicating means connected to the output circuit of said second vacuum tube, the output circuit of said first vacuum tube having a small time constant whereby the capacitor thereof is charged in proportion to the maximum value of the voltage impressed upon said first vacuum tube, and the output circuit of said second vacuum tube having a relatively large time constant whereby said indicating means are enabled to measure the peak value of impressed voltage pulses.

3. A measuring device comprising a first cathode follower circuit adapted to have impressed thereon voltages whose peak amplitudes are to be measured, a first output circuit including a capacitor connected to said first cathode follower and having a small time constant, a second cathode follower circuit having the input thereof connected to said first output circuit, a second output circuit including a capacitor connected to said second cathode follower and having a large time constant relative to the time constant of said first output circuit, and voltage indicating means connected to said second output circuit and indicating the peak amplitudes of voltages impressed on said first cathode follower circuit.

CARL E. GRUNSKY.

REFERENCES CITED

The following references are of record in the file of this patent:

UNITED STATES PATENTS

| Number | Name | Date |
| --- | --- | --- |
| 2,014,102 | Conklin | Sept. 10, 1935 |
| 2,181,879 | Edgerton | Dec. 5, 1939 |
| 2,300,198 | Brown | Oct. 27, 1942 |
| 2,457,891 | Henninger et al. | Jan. 4, 1949 |
| 2,468,687 | Schmidt | Apr. 26, 1949 |
| 2,547,978 | Ryerson et al. | Apr. 10, 1951 |

OTHER REFERENCES

Electronics, September 1945, pages 110, 111, "Transient Peak Voltmeter" by Ryerson and Aronson.